(12) United States Patent
Zeng et al.

(10) Patent No.: US 12,373,669 B2
(45) Date of Patent: Jul. 29, 2025

(54) METHOD AND SYSTEM FOR USING DEEP VIDEO PREDICTION FOR ECONOMIC FORECASTING

(71) Applicant: JPMorgan Chase Bank, N.A., New York, NY (US)

(72) Inventors: Zhen Zeng, Ypsilanti, MI (US); Tucker Richard Balch, Suwanee, GA (US); Maria Manuela Veloso, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 296 days.

(21) Appl. No.: 17/452,676

(22) Filed: Oct. 28, 2021

(65) Prior Publication Data

US 2022/0138778 A1    May 5, 2022

Related U.S. Application Data

(60) Provisional application No. 63/107,877, filed on Oct. 30, 2020.

(51) Int. Cl.
*G06Q 40/04* (2012.01)
*G06N 3/045* (2023.01)

(52) U.S. Cl.
CPC ............. *G06N 3/045* (2023.01); *G06Q 40/04* (2013.01)

(58) Field of Classification Search
None
See application file for complete search history.

(56) References Cited

U.S. PATENT DOCUMENTS

| | | | | |
|---|---|---|---|---|
| 7,043,449 | B1* | 5/2006 | Li | G06Q 40/04 |
| | | | | 705/36 R |
| 8,195,553 | B2* | 6/2012 | Helweg | G06Q 40/00 |
| | | | | 705/36 R |
| 10,185,893 | B2* | 1/2019 | Townsend | G06V 10/82 |
| 2004/0148247 | A1* | 7/2004 | Miller | G06Q 40/04 |
| | | | | 705/37 |
| 2005/0144102 | A1* | 6/2005 | Johnson | G06Q 40/02 |
| | | | | 705/35 |

(Continued)

OTHER PUBLICATIONS

Franceschi et al. "Stochastic Latent Residual Video Prediction." Thirty-seventh International Conference on Machine Learning, International Machine Learning Society, Aug. 2020, Vienne, Austria. pp. 89-102 (Year: 2020).*

(Continued)

*Primary Examiner* — Jamie H Austin
(74) *Attorney, Agent, or Firm* — Greenblum & Bernstein, P.L.C.

(57) ABSTRACT

A method for forecasting a change in a market is provided. The method includes: using historical market data to generate a plurality of first images that correspond to a predetermined time sequence; generating, based on the plurality of first images, second images that correspond to a future time point with respect to the predetermined time sequence; and determining a prediction of future market data based on the second images. The generation of the second images and the prediction of the future market data are implemented by applying a convolutional neural network (CNN) algorithm that implements a stochastic latent residual video prediction (SRVP) technique with respect to a group of financial assets.

17 Claims, 9 Drawing Sheets

(56) References Cited

U.S. PATENT DOCUMENTS

| | | | | |
|---|---|---|---|---|
| 2007/0087756 | A1* | 4/2007 | Hoffberg | G06Q 10/06375 |
| | | | | 455/450 |
| 2008/0183639 | A1* | 7/2008 | DiSalvo | G06Q 40/06 |
| | | | | 705/36 R |
| 2010/0235285 | A1* | 9/2010 | Hoffberg | G06Q 50/188 |
| | | | | 705/37 |
| 2011/0047095 | A1* | 2/2011 | Cushing | G06Q 40/06 |
| | | | | 705/36 R |
| 2011/0187710 | A1* | 8/2011 | Giovinazzi | G06T 15/00 |
| | | | | 345/419 |
| 2014/0139546 | A1* | 5/2014 | Holten | G06Q 40/00 |
| | | | | 345/592 |
| 2014/0258068 | A1* | 9/2014 | Thorsen | G06Q 40/04 |
| | | | | 705/37 |
| 2015/0088719 | A1* | 3/2015 | Gras | G06Q 40/00 |
| | | | | 705/35 |
| 2015/0154700 | A1* | 6/2015 | Hackett | G06Q 40/04 |
| | | | | 705/37 |
| 2017/0249534 | A1* | 8/2017 | Townsend | G06V 10/82 |
| 2018/0012239 | A1* | 1/2018 | Studnitzer | G06Q 30/0201 |
| 2019/0379589 | A1* | 12/2019 | Ryan | G06F 17/142 |
| 2020/0311749 | A1* | 10/2020 | Sridharan | G06Q 30/0202 |
| 2021/0004682 | A1* | 1/2021 | Gong | G06N 3/08 |
| 2021/0042382 | A1* | 2/2021 | Freeman | G06F 17/40 |
| 2021/0224700 | A1* | 7/2021 | Wang | G06N 3/044 |
| 2022/0138778 | A1* | 5/2022 | Zeng | G06N 3/045 |
| | | | | 705/7.31 |

OTHER PUBLICATIONS

H. Ziegler, M. Jenny, T. Gruse and D. A. Keim, "Visual market sector analysis for financial time series data," 2010 IEEE Symposium on Visual Analytics Science and Technology, Salt Lake City, UT, USA, 2010, pp. 83-90, doi: 10.1109/VAST.2010.5652530. (Year: 2010).*

* cited by examiner

METHOD AND SYSTEM FOR USING DEEP VIDEO PREDICTION FOR ECONOMIC FORECASTING

CROSS-REFERENCE TO RELATED APPLICATIONS

This application claims the benefit from U.S. Provisional Application No. 63/107,877, filed Oct. 30, 2020, which is hereby incorporated by reference in its entirety.

BACKGROUND

1. Field of the Disclosure

This technology generally relates to methods and systems for using deep video prediction for economic forecasting, and more particularly to methods and systems for converting time-series data into images using two-dimensional visualization techniques and then forecasting future images that may be mapped to market forecasts.

2. Background Information

In many time series forecasting tasks such as predictions on market, sales, and weather, the underlying data is non-image. Common statistical methods such as Auto Regressive Integrated Moving Average (ARIMA) have been widely adopted across these domains for time series forecasting tasks. These methods consider the history of the numerical data and predict the future values of the observed data. Conversely, given tables or lists of numerical data, humans rely much more on visualizing the underlying numerical data rather than directly eyeing at the numbers themselves to develop a high-level understanding of the data. For example, experienced traders develop intuition for making buy/sell decisions by observing visual market charts.

The power of visualizations lies in that they provide spatial structural information when laving out the underlying data in two-dimensional (2D) images, which is not available in the original data. When looking at visualizations, human eyes are proficient at capturing spatial structure or patterns to help make better decisions or predictions. Advances in deep learning and computer vision have shown that Convolutional Neural Networks (CNNs) carry the capabilities to extract features of local spatial regions, which enables systems to recognize spatial patterns such as those in object detection and recognition tasks.

Time series forecasting has many applications across diverse domains, e.g. finance, climate, resource allocation, etc. Among a collection of statistical tools, exponential smoothing and ARIMA are two of the most widely adopted approaches for time series forecasting. Exponential smoothing predicts the future value of a random variable by a weighted average of its past values, where the weight associated with each past value decreases exponentially as a function of time. Several variations of exponential smoothing have been proposed to consider trend and seasonality in the data. ARIMA combines autoregressive and moving average models for forecasting and ARIMAs use differencing to help reduce trend and seasonality in the data. However, ARIMA, as well as the vector autoregressive (VAR) model for multivariate cases, cannot capture nonlinear patterns in time series, thus rendering the approaches insufficient for forecasting when nonlinear patterns occur. Accordingly, the present inventors has recognized that a neural network based approach, which is nonlinear, may outperform ARIMA.

SUMMARY

The present disclosure, through one or more of its various aspects, embodiments, and/or specific features or sub-components, provides, inter various systems, servers, devices, methods, media, programs, and platforms for converting time-series data into images using two-dimensional visualization techniques and then forecasting future images that may be mapped to market forecasts.

According to an aspect of the present disclosure, a method for forecasting a change in a market is provided. The method is implemented by at least one processor. The method includes: using, by the at least one processor, historical market data to generate a plurality of first images that correspond to a predetermined time sequence; generating, based on the plurality of first images by the at least one processor, at least one second image that corresponds to a future time point with respect to the predetermined time sequence; and determining, by the at least one processor, a prediction of future market data based on the at least one second image.

The historical market data may include a respective plurality of daily market closing values for each of a predetermined plurality of financial assets. The plurality of first images may include, for each respective financial instrument from the predetermined plurality of financial assets, a corresponding rectangle that is color-coded based on each respective daily market closing value.

Each corresponding rectangle may be color-coded based on a gray scale that includes a value between zero and 255.

For each of the plurality of first images, each corresponding rectangle may be arranged based on at least one correlation between the respective daily market closing values for corresponding ones of the predetermined plurality of financial assets.

The method may further include applying a convolutional neural network (CNN) and Long Short-Term Memory (LSTM) algorithm in order to generate the at least one second image.

The CNN and LSTM algorithm may implement a stochastic latent residual video prediction (SRVP) technique for the determining of the prediction of future market data that relates to a predetermined plurality of financial assets.

The SRVP technique may include a full SRVP technique by which the future market data is determined jointly with respect to the predetermined plurality of financial assets.

Alternatively, the SRVP technique may include an individual SRVP technique by which the future market data for each of the predetermined plurality of financial assets is determined independently.

As another alternative, the SRVP technique may include a shuffled SRVP technique by which the at least one second image is modified by rearranging respective portions of the at least one second image based on at least one known correlation as between respective pairs of individual financial assets from among the predetermined plurality of financial assets, and the future market data is determined jointly with respect to the predetermined plurality of financial assets based on the modified at least one second image.

According to another aspect of the present disclosure, a computing apparatus for forecasting a change in a market is provided. The computing apparatus includes a processor; a memory; and a communication interface coupled to each of the processor and the memory. The processor is configured to: use historical market data to generate a plurality of first images that correspond to a predetermined time sequence; generate, based on the plurality of first images, at least one second image that corresponds to a future time point with respect to the predetermined time sequence; and determine a prediction of future market data based on the at least one second image.

The historical market data may include a respective plurality of daily market closing values for each of a predetermined plurality of financial assets. The plurality of first images may include, for each respective financial instrument from the predetermined plurality of financial assets, a corresponding rectangle that is color-coded based on each respective daily market closing value.

Each corresponding rectangle may be color-coded based on a gray scale that includes a value between zero and 255.

For each of the plurality of first images, each corresponding rectangle may be arranged based on at least one correlation between the respective daily market closing values for corresponding ones of the predetermined plurality of financial assets.

The processor may be further configured to apply a convolutional neural network (CNN) and Long Short-Term Memory (LSTM) algorithm for performing the generation of the at least one second image.

The CNN and LSTM algorithm may be configured to implement a stochastic latent residual video prediction (SRVP) technique for the determination of the prediction of future market data that relates to a predetermined plurality of financial assets.

The SRVP technique may include a fill SRVP technique by which the future market data is determined jointly with respect to the predetermined plurality of financial assets.

Alternatively, the SRVP technique may include an individual SRVP technique by which the future market data for each of the predetermined plurality of financial assets is determined independently.

As another alternative, the SRVP technique may include a shuffled SRVP technique by which the at least one second image is modified by rearranging respective portions of the at least one second image based on at least one known correlation as between respective pairs of individual financial assets from among the predetermined plurality of financial assets, and the future market data is determined jointly with respect to the predetermined plurality of financial assets based on the modified at least one second image.

According to yet another aspect of the present disclosure, a non-transitory computer readable storage medium storing instructions for forecasting a change in a market is provided. The storage medium includes executable code which, when executed by a processor, causes the processor to: use historical market data to generate a plurality of first images that correspond to a predetermined time sequence; generate, based on the plurality of first images, at least one second image that corresponds to a future time point with respect to the predetermined time sequence; and determine a prediction of future market data based on the at least one second image.

The historical market data may include a respective plurality of daily market closing values for each of a predetermined plurality of financial assets. The plurality of first images may include, for each respective financial instrument from the predetermined plurality of financial assets, a corresponding rectangle that is color-coded based on each respective daily market closing value.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
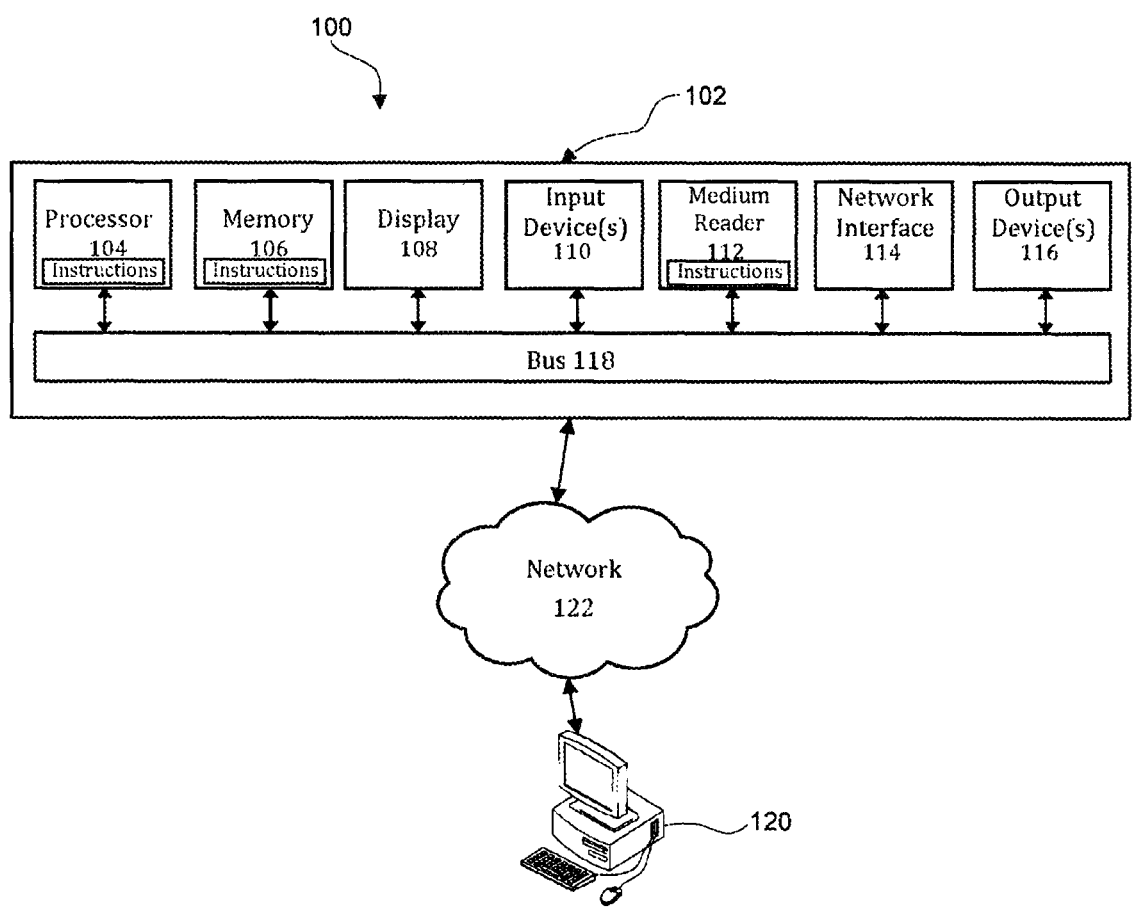
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (L), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system ((IPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for converting time-series data into images using two-dimensional visualization techniques and then forecasting future images that may be mapped to market forecasts.

Figure 2:
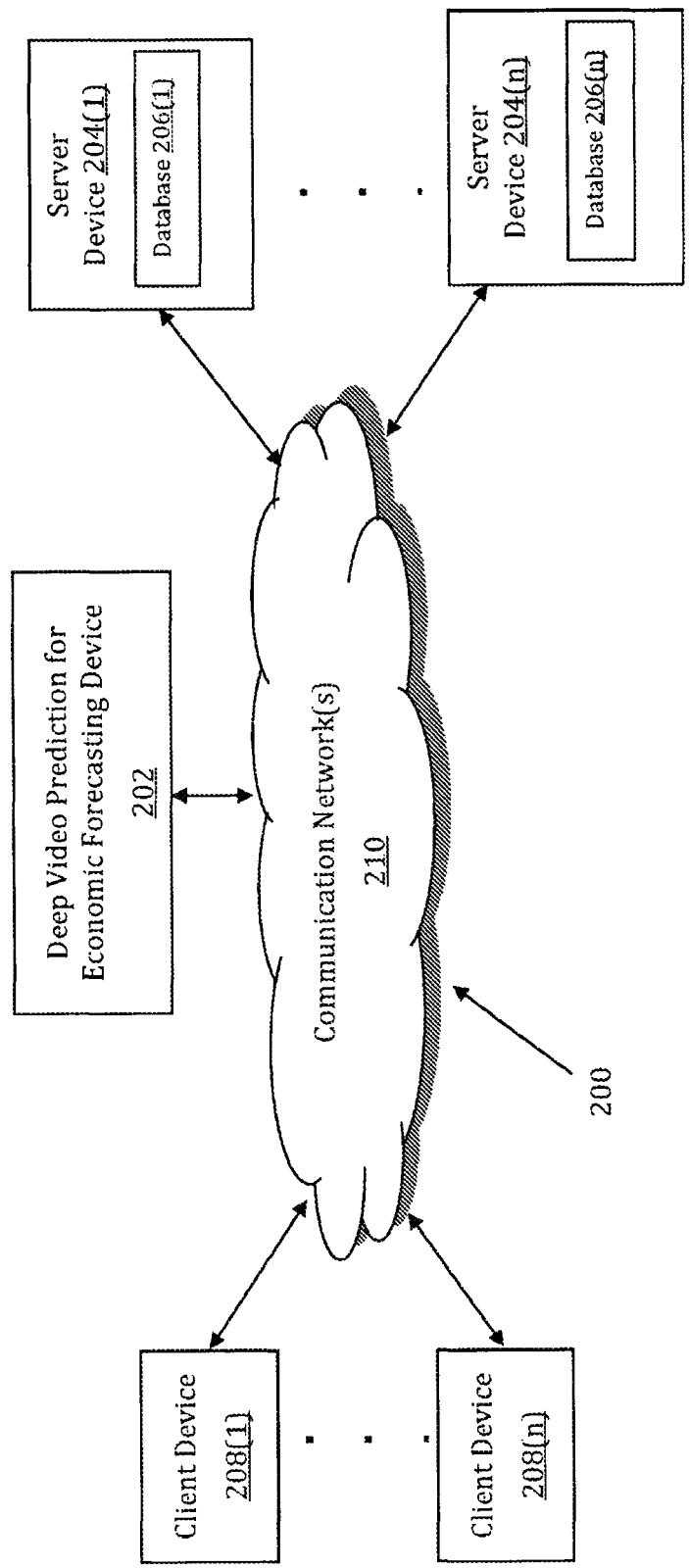
FIG. 2 illustrates an exemplary diagram of a network environment.

Referring to FIG. 2, a schematic of an exemplary network environment 200 for implementing a method for converting time-series data into images using two-dimensional visualization techniques and then forecasting future images that may be mapped to market forecasts is illustrated. In an exemplary embodiment, the method is executable on any networked computer platform, such as, for example, a personal computer (PC).

The method for converting time-series data into images using two-dimensional visualization techniques and then forecasting future images that may be mapped to market forecasts may be implemented by a Deep Video Prediction for Economic Forecasting (DVPEF) device 202. The DVPEF device 202 may be the same or similar to the computer system 102 as described with respect to FIG. 1. The DVPEF device 202 may store one or more applications that can include executable instructions that, when executed by the DVPEF device 202, cause the DVPEF device 202 to perform actions, such as to transmit, receive, or otherwise process network messages, for example, and to perform other actions described and illustrated below reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DVPEF device 202 itself, may be located in virtual servers) running in a cloud-based computing environment rather than being tied to one or more specific physical network computing devices. Also, the application(s) may be running in one or more virtual machines (VMs) executing on the DVPEF device 202. Additionally, in one or more embodiments of this technology, virtual machine(s) running on the DVPEF device 202 may be managed or supervised by a hypervisor.

In the network environment 200 of FIG. 2, the DVPEF device 202 is coupled to a plurality of server devices 204(1)-204(n) that hosts a plurality of databases 206(1)-206(n), and also to a plurality of client devices 208(1)-208(n) via communication network(s) 210. A communication interface of the DVPEF device 202, such as the network interface 114 of the computer system 102 of FIG. 1, operatively couples and communicates between the DVPEF device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DVPEF device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DVPEF devices that efficiently implement a method for converting time-series data into images using two-dimensional visualization techniques and then forecasting future images that may be mapped to market forecasts.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DVPEF device 202 may be a standalone device or integrated with one or more other devices or apparatuses, such as one or more of the server devices 204(1)-204(n), for example. In one particular example, the DVPEF device 202 may include or be hosted by one of the server devices 204(1)-204(n), and other arrangements are also possible. Moreover, one or more of the devices of the DVPEF device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DVPEF device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store historical market data and data that relates to two-dimensional video prediction images.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DVPEF device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DVPEF device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DVPEF device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DVPEF device 202, the server devices 204(1)-204(n), or the client devices 208(1)-208(n), for example, may be configured to operate as virtual instances on the same physical machine. In other words, one or more of the DVPEF device 202, the server devices 204(1)-204(n), or the client devices 208(1)-208(n) may operate on the same physical device rather than as separate devices communicating through communication network(s) 210. Additionally, there may be more or fewer DVPEF devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
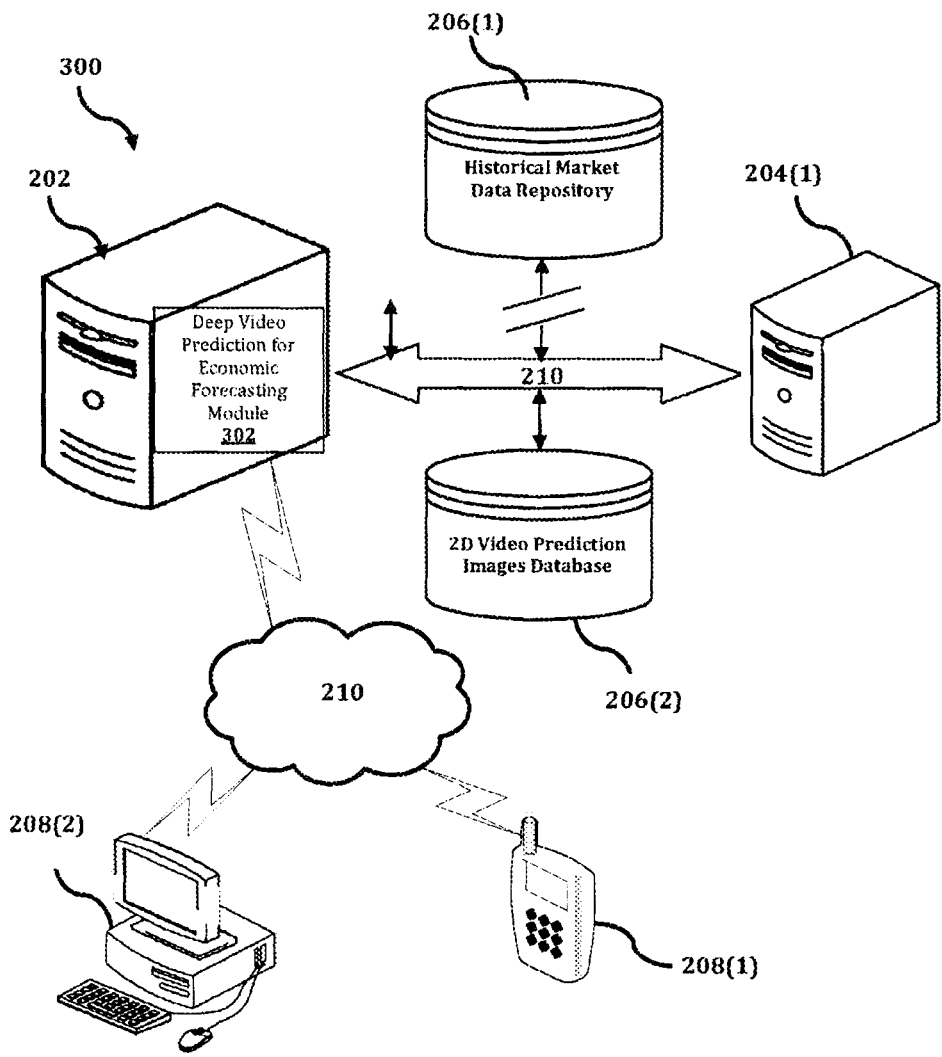
FIG. 3 shows an exemplary system for implementing a method for converting time-series data into images using two-dimensional visualization techniques and then forecasting future images that may be mapped to market forecasts.

The DVPEF device 202 is described and illustrated in FIG. 3 as including a deep video prediction for economic forecasting module 302, although it may include other rules, policies, modules, databases, or applications, fix example. As will be described below, the deep video prediction for economic forecasting module 302 is configured to implement a method for converting time-series data into images using two-dimensional visualization techniques and then forecasting future images that may be mapped to market forecasts.

An exemplary process 300 for implementing a mechanism tier converting time-series data into images using two-dimensional visualization techniques and then forecasting future images that may be mapped to market forecasts by utilizing the network environment of FIG. 2 is illustrated as being executed in FIG. 3. Specifically, a first client device 208(1) and a second client device 208(2) are illustrated as being in communication with DVPEF device 202. In this regard, the first client device 208(1) and the second client device 208(2) may be "clients" of the DVPEF device 202 and are described herein as such. Nevertheless, it is to be known and understood that the first client device 208(1) and/or the second client device 208(2) need not necessarily be "clients" of the DVPEF device 202, or any entity described in association therewith herein. Any additional or alternative relationship may exist between either or both of the first client device 208(1) and the second client device 208(2) and the DVPEF device 202, or no relationship may exist.

Further, DVPEF device 202 is illustrated as being able to access a historical market data repository 206(1) and a 2D video prediction images database 206(2). The deep video prediction for economic forecasting module 302 may be configured to access these databases for implementing a method for converting time-series data into images using two-dimensional visualization techniques and then forecasting future images that may be mapped to market forecasts.

The first client device 208(1) may be, for example, a smartphone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DVPEF device 202 via broadband or cellular communication. Of course, these embodiments are merely exemplary and are not limiting or exhaustive.

Upon being started, the deep video prediction for economic forecasting module 302 executes a process for converting time-series data into images using two-dimensional visualization techniques and then forecasting future images that may be mapped to market forecasts. An exemplary process for converting time-series data into images using two-dimensional visualization techniques and then forecasting future images that may be mapped to market forecasts is generally indicated at flowchart 400 in FIG. 4.

Figure 4:
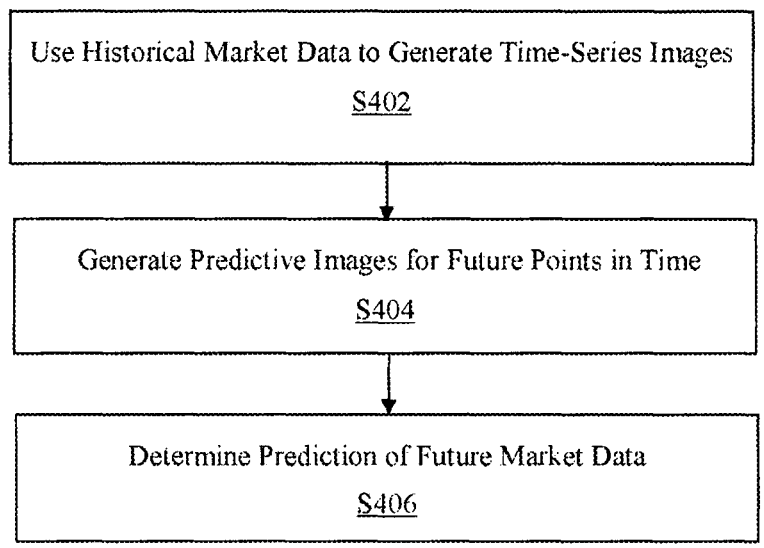
FIG. 4 is a flowchart of an exemplary process for implementing a method for converting time-series data into images using two-dimensional visualization techniques and then forecasting future images that may be mapped to market forecasts.

In process 400 of FIG. 4, at step S402, the deep video prediction for economic forecasting module 302 uses historical market data to generate a set of first time-series images. In an exemplary embodiment, the historical market data includes a set of daily market closing values for each of a corresponding set of financial assets, such as, for example, prices of stock shares in various publicly traded companies. In an exemplary embodiment, each of the first time-series images includes a set of rectangles that is color-coded based on the corresponding daily market closing value, and the color coding may be based on a gray scale that includes a value that falls between zero (0) and 255 inclusive.

At step S404, the deep video prediction for economic forecasting module 302 generates predictive images for future points in time based on the set of first time-series images. In an exemplary embodiment, the generation of the predictive images is performed by applying a convolutional neural network (CNN) and Long Short-Term Memory (LSTM) algorithm to the set of first time-series images. In an exemplary embodiment, the color-coded rectangles that correspond to the daily market closing values may be arranged such that financial assets for which there is a known correlation are located spatially close to one another within each first time-series image, in order to improve a quality of the output of the CNN and LSTM algorithm.

At step S406, the deep video prediction for economic forecasting module 302 makes a prediction of future market data based on the generated predictive images. In an exemplary embodiment, the CNN and LSTM algorithm implements a stochastic latent residual video prediction (SRVP) technique for the purpose of making the prediction. In an exemplary embodiment, the SRVP technique may include a full SRVP technique by which the future market data is determined jointly with respect to the entire set of financial assets. Alternatively, the SRVP technique may include an individual SRVP technique by which the future market data for each individual one of the set of financial assets is determined independently.

As another alternative, the SRVP technique may include a shuffled SRVP technique by which the predictive images are modified by rearranging respective portions of the predictive images based on at least one known correlation as between respective pairs of individual financial assets from among the set of financial assets. In this alternative embodiment, the future market data is determined jointly with respect to the entire set of financial assets based on the modified predictive images.

Time series prediction is essential for decision making in many domains. In an exemplary embodiment, the challenge of predicting the evolution of prices over time among potentially interacting financial assets is addressed. A solution to this problem has clear import for governments, banks, and investors. Statistical methods such as Auto Regressive Integrated Moving Average (ARIMA) are widely applied for these problems. In an exemplary embodiment, computer vision techniques may be used for single variable time series prediction when the problem is treated as a missing data problem. In an exemplary embodiment, the approach may be extended by using video prediction to solve the multi-variable case. Two distinctive domains, a non-image domain versus an image domain, are bridged, and the benefits of video prediction are provided with respect to non-image problems, Time-series data is converted into images using two-dimensional (2D) visualizations which provide spatial structure to the data. With visualizations of non-image time-series data, state of-the-art video prediction techniques are used for forecasting the future images. For market forecasting tasks, experiments show that a method according to one or more exemplary embodiments outperforms conventional baseline methods including ARIMA, as well as some variations of the proposed method. The approach enables a treatment of the multiple market components jointly. The experiments use the method to predict the evolution of prices of nine assets traded in U.S. stock markets. In an exemplary embodiment, this joint approach provides a higher quality prediction as well as the benefits of domain knowledge for visualizing the market data.

Inspired by how humans benefit from visualizations of numerical data, in an exemplary embodiment, visualizations and convolutional neural networks (CNNs) are employed advantageously for time series forecasting tasks that were originally studied in non-image domains. In this aspect, a unique perspective is taken in predicting non-image time-series data through the lens of computer vision. To achieve this, the data is first visualized into videos, and then video prediction techniques are used to predict future video frames, i.e., future visualizations of the underlying non-image data.

The experiments focus on the task of forecasting market changes over time, where nine (9) publicly traded financial assets, including two stocks and seven Exchange-Traded Funds (ETFs), are being considered. It may be seen that a method according to an exemplary embodiment outperforms other baselines, including ARIMA (on non-image numerical data), and alternative methods according to other exemplary embodiments. In addition, it may be seen that a method according to an exemplary embodiment is able to learn high-level knowledge of the overall market when learning these assets jointly, thereby producing better prediction accuracy compared to learning each asset independently. An advantage of using domain knowledge in visualizations is also seen.

Problem Formulation: Given a time series of a random variable $\{x_0, x_1, \ldots, x_t\}$, where $x_t \in \mathcal{R}^d$, the goal is to predict the values of the random variable at future tune stamps $\{x_{t+1}, x_{t+2}, \ldots\}$. In an exemplary embodiment, for each time t, $x_t$ may be visualized as an image, i.e., $x_t \rightarrow I_t$. Then the task of predicting $x_{t+\Delta t}$ is converted to a video prediction task, i.e., predicting future image frames $I_{t+\Delta t}$ given an input video clip.

Visualization: The particular visualizations of the underlying data vary across domains. Humans usually rely on domain knowledge to develop visualizations of numerical data, and these visualizations evolve over time as humans continuously improve them. There is no intention to provide a unified way to visualize all numerical data across arbitrary domains. Domain knowledge is important, and aiming to provide a unified way of visualizations poses the risk of losing domain knowledge.

Regardless of domains, a rule of thumb for generating visualizations of time-series data is that correlated data shall be visualized in a way such that they are spatially close to each other in the 2D image. The intuitive reason for this principle is that when looking at visualizations, CNN is good at extracting structural features in local regions represented by its limited receptive field. By visualizing correlated data (i.e. potentially dependent) so as to be spatially close in an image, CNN is more likely to learn the high-level joint features of these correlated data, which can be exploited for prediction tasks. In this aspect, separating correlated data in visualizations results in a drop of prediction accuracy.

Figure 5:
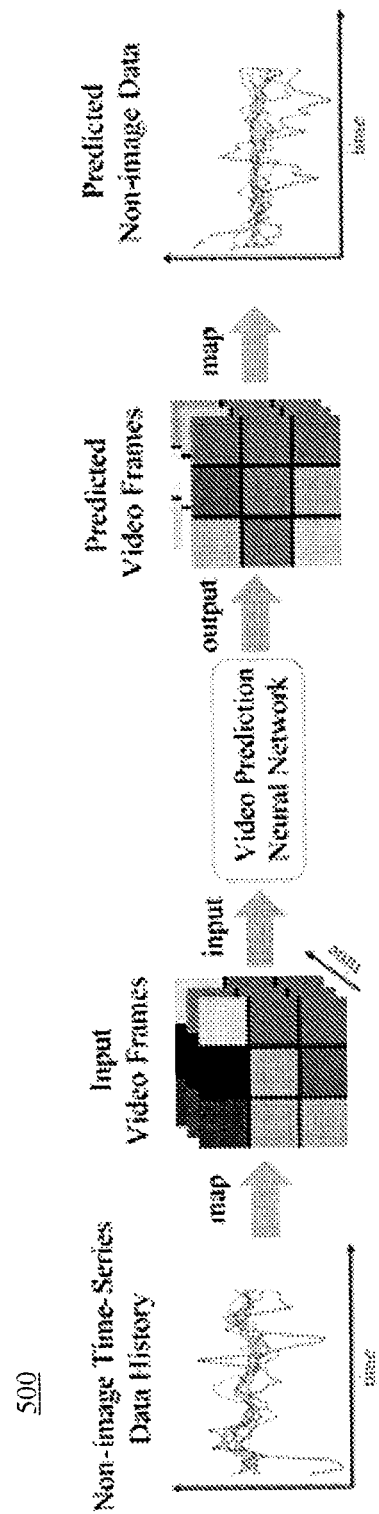
FIG. 5 is a diagram that illustrates an overview of a method for converting time-series data into images using two-dimensional visualization techniques and then forecasting future images that may be mapped to market forecasts, according to an exemplary embodiment.

FIG. 5 is a diagram 500 that illustrates an overview of a method for converting time-series data into images using two-dimensional visualization techniques and then forecasting future images that may be mapped to market forecasts, according to an exemplary embodiment.

Given the time-series market history of nine (9) assets in terms of relative percentage change $\delta$ of close values, i.e., $x_t = [\delta_t^1, \ldots, \delta_t^9]^T$, the goal is to predict future percentage changes of these assets. In an exemplary embodiment, the percentage changes of these 9 assets may be visualized in a 3×3 tile heatmap, as illustrated in FIG. 5. In particular, the percentage change of ith asset at time t, $\delta_t^i$, is converted into a pixel $p \in I_t$, such that the following expressions are satisfied:

$$p = S(\delta_t^i) * 255 \quad (1)$$

$$S(x) = \frac{1}{1 + e^{-x}} \quad (2)$$

where $S: \mathcal{R} \ 7=[0, 1]$ is a sigmoid function, thus $p \in [0.255]$. For example, if $\delta_t^i = 3$, meaning that ith asset has a 3% increase in its close value at time t, then the corresponding pixel value will be 243. As such, the higher the percentage increase, the brighter the visualized pixel. Similarly, the greater the percentage decrease, the darker the visualized pixel.

Building on recent advances in deep learning and computer vision, video prediction techniques have demonstrated an ability to predict future frames given initial frames of a video. In an exemplary embodiment, a video prediction method known as Stochastic Latent Residual Video Prediction (SRVP) is used for the prediction task. Compared to conventional techniques which rely on image-autoregressive recurrent networks, SRVP decouples frame synthesis and video dynamics estimation.

Figure 6:
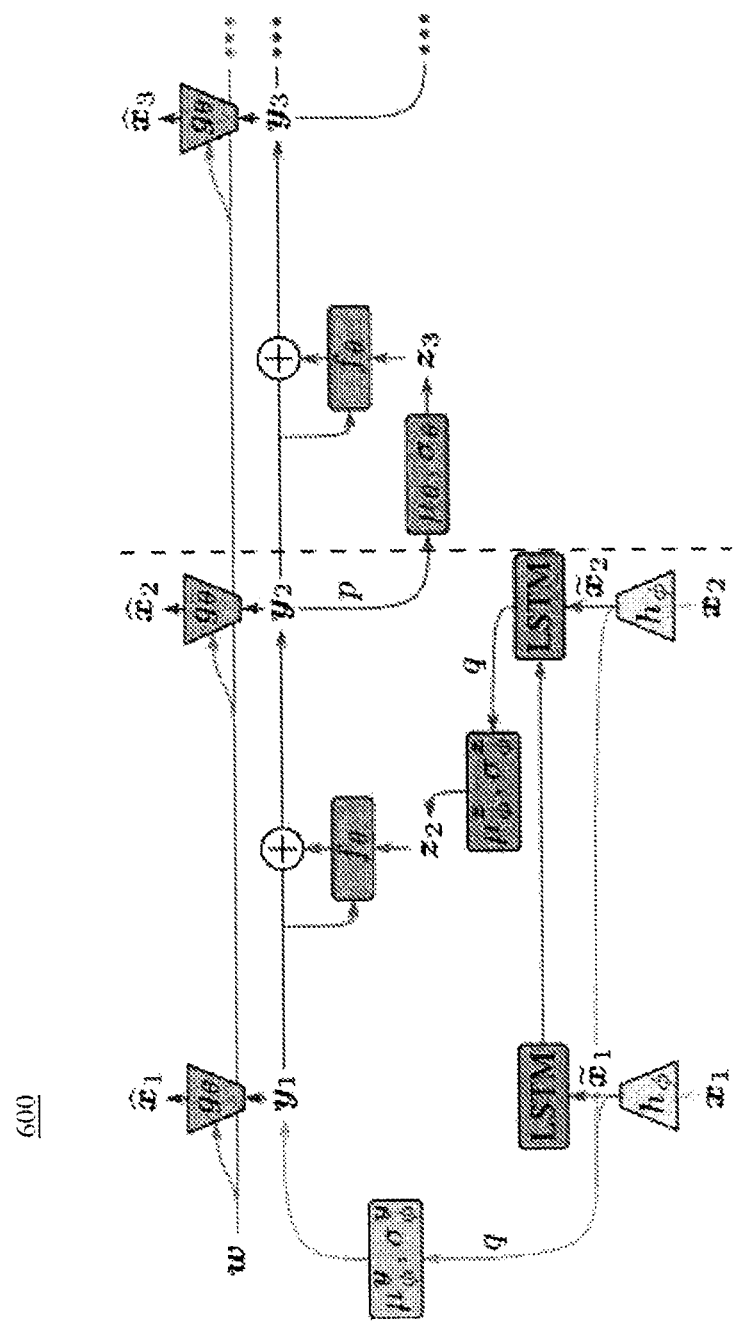
FIG. 6 is a diagram that illustrates a variational autoencoder and video prediction network that is usable for implementing a method for converting time-series data into images using two-dimensional visualization techniques and then forecasting future images that may be mapped to market forecasts, according to an exemplary embodiment.

FIG. 6 is a diagram 600 that illustrates an SRVP variational autoencoder and video prediction network that is usable for implementing a method for converting time-series data into images using two-dimensional visualization techniques and then forecasting future images that may be mapped to market forecasts, according to an exemplary embodiment. As shown in FIG. 6, SRVP explicitly models the state as well as the dynamics of the video in a latent space. Specifically, $x_t$ denotes the frames in the input video, $y_t$ is the latent state variable, $z_t$ is the latent state dynamics variable, and w is a content variable that encodes the static content in the video (e.g. static background, constant shape of foreground object, etc). The latent state $y_t$ propagates forward with transition function $f_\theta$, $$y_{t+1} = y_t + f_\theta(z_{t+1}),$$

where $f_\theta$ is an Multilayer Perception (MLP) that learns the first-order movement of latent state $y_t$. $h_\phi$ is an CNN-based encoder network that encodes input frames $x_t$ into a encoded frames $\tilde{x}_t$. The initial latent state $y_1 \sim N(\mu_\phi^y, \sigma_\phi^y)$ is inferred from the first k encoded frames $\tilde{x}_{1:k}$. k=5 is used in the experiments described below. The latent dynamics $z_t \sim N(\mu_\phi^z, \sigma_\phi^z)$ are interred through a long short-term memory (LSTM) on the encoded frames. The content variable w is inferred through a permutation-invariant function given few encoded frames. Finally, $g_\theta$ is a decoder network that concatenates the content variable w and latent state $y_t$ and decodes it hack to the original space of $x_t$, thus producing the estimated $\tilde{x}_t$.

In the experiments, VGG16 is used as the encoder network $h_\phi$ and mirrored VGG16 is used as the decoder network $g_\theta$. The image size is 64×64. Note that when there is a need to predict future $z_t$ when $x_t$ is not available, instead of interring $z_t$ through LSTM on $x_t$ as described above, $z_t$ is inferred from $y_{t-1}$ through another MLP function p as shown on the right side of FIG. 6. Fifty (50) dimensions are used for both $y_t$ and $z_t$. The loss function is negative log-likelihood and L2 regularization is used to prevent overfitting. Adam is used for optimization during training, with learning rate $\alpha = 3e^{-3}$, and $\beta_1 = 0.9$, $\beta_2 = 0.999$, $\varepsilon = 1e^{-8}$.

The experiments focus on the task of forecasting market changes. Nine assets in the market are considered, including the following: 1) Delta Air Lines, Inc. (DAL); 2) SPDR S&P 500 ETF Trust (SPY); 3) Vanguard Real Estate Index Fund ETF Shares (VNQ); 4) Tesla, (TSLA), 5) SPDR Dow Jones Industrial Average ETF Trust (DIA); 6) SPDR Gold Shares (COLD); 7) United States Oil Fund, LP (USO), 8) iShares 20±Year Treasury Bond ETF (TLT); and 9) iShares Core U.S. Aggregate Bond ETF AGG).

A deliberate selection of a diverse group of assets that are known to behave in different ways relative to one another is made for the experiments. For instance, the airline stock DAL will usually go up in price when the oil ETF USO goes down in price. This is because fuel derived from oil is one of the primary operating costs for airlines, and a decrease in fuel prices can be predictive of future profits. Similarly, SPY, which represents large U.S. company stocks, is typically inversely related to the price movement of TLT which represents long term bonds. Other assets in the mix share other correlations or anti-correlations that reflect the structure of the U.S. economy. It is believed that a learning system night be able to learn these relationships.

For the experiments, the closing values of these assets from Jun. 29, 2010 to Dec. 31, 2019 was used. The collected data was pre-processed to calculate the percentage change of each asset close value on each day with respect to its close value five days prior. Given the percentage changes of assets over five consecutive days, the task is to predict the future percentage changes of assets for the next 10 days. The historical data from Jun. 29, 2010 to Dec. 31, 2018 was used for training, and the historical data from Jan. 1, 2019 to Dec. 31, 2019 was used for testing. We benchmarked the prediction performance of the video prediction method SRVP (referred as SRVP-Full below), against baseline methods including ARIMA (i.e., on original non-image data) and variations of SRVP.

In particular, the following variations were used:

SRVP-Full: The numerical data of market percentage change is converted into visualizations of 3×3 tile heatmap as described above. Then 5 frames are provided as inputs to the SRVP neural network, which outputs 10 future frames as predictive images. Thus, the learned SRVP neural network predicts all 9 assets market change jointly. Note that the 3×3 tile arrangements of the 9 assets are based on domain knowledge, such that known to be correlated assets are located spatially close to each other.

SRVP-Ind: Instead of visualizing all 9 assets in a 3×3 tile heatmap and learning to predict jointly as in SRVP-Full, each asset market percentage change is converted into a single tile heatmap, thus producing one video clip for each asset. For each individual asset, a SRVP neural network is independently trained to predict its future percentage change.

SRVP-Shuffled: This baseline method is the same as SRVP-Full, except that 3×3 tile arrangements of the 9 assets are shuffled such that the image goes against the domain knowledge, meaning that assets that are known to be correlated are located spatially apart from each other.

SRVP-DeepInsight: DeepInsight takes a similar perspective of converting non-image data to image data, and adopts computer vision techniques on the image data. The DeepInsight methodology is used to visualize the non-image data, by corresponding each dimension of the non-image data with a 2D pixel coordinate on the image plane through principal component analysis (PCA) SRVP is then applied on the resulting visualizations.

SRVP-Non-Image: Instead of turning the numerical data into 2D heatmaps, the original non-image data (normalized to [0, 1]) is directly used as a 9×1 vector. In order to use the same SRVP network architecture as in other baselines to match the complexity, the 9×1 vectors are repeated to match the same size of input used in other baselines. Note that this method can be perceived as a neural network based nonlinear vector autoregressive model.

ARIMA: For each asset, ARIMA is directly applied to the non-image numerical data to predict its future percentage changes. Auto ARIMA was used to search for a proper set of parameter for each asset.

Figure 7:
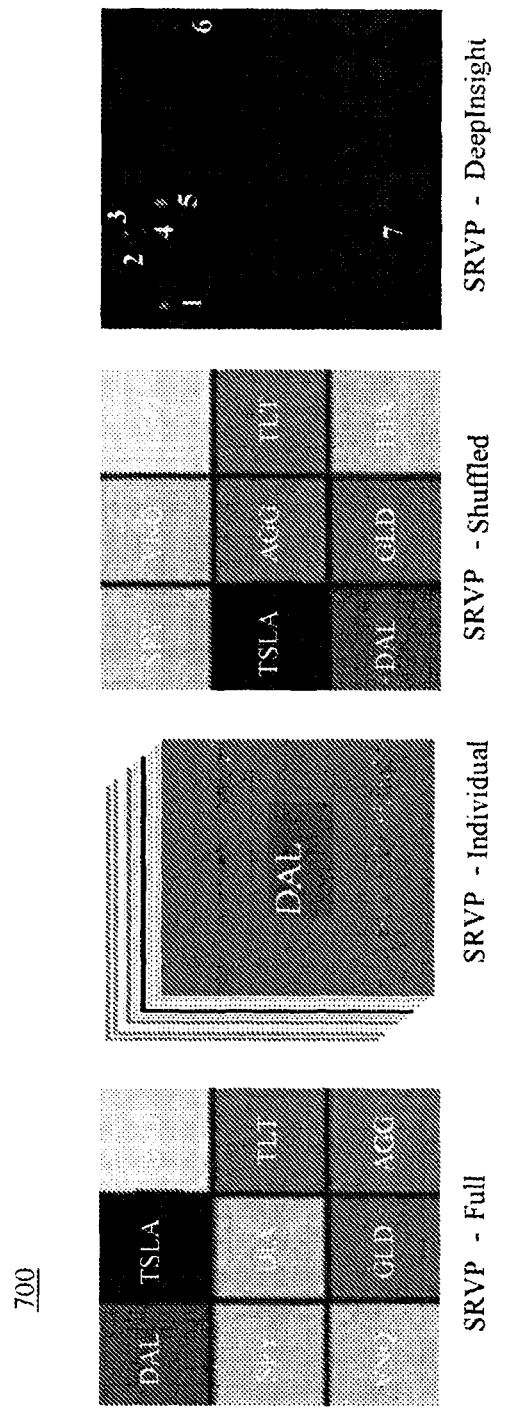
FIG. 7 is an illustration of visualization examples for different implementations of a stochastic latent residual video prediction technique as incorporated into a method for converting time-series data into images using two-dimensional visualization techniques and then forecasting future images that may be mapped to market forecasts, according to an exemplary embodiment.

FIG. 7 is an illustration 700 of visualization examples for different implementations of a stochastic latent residual video prediction technique as incorporated into a method for converting time-series data into images using two-dimensional visualization techniques and then forecasting future images that may be mapped to market forecasts, according to an exemplary embodiment. As shown in FIG. 7, only visualizations for methods that do involve a visualization step and learn in image domain are illustrated, thus excluding SRVP-Non-Image and ARIMA.

In order to measure the prediction performance, the error of the predicted sign of asset relative percentage change is evaluated. This error is defined as $$Err = \sum_k \sum_i w_k D(\delta_k^i, \hat{\delta}_k^i) \qquad (3)$$

$$w_k = e^{-\lambda k} \qquad (4)$$

where $D(\delta_k^i, \hat{\delta}_k^i)$ measures the sign difference between the ground truth $\delta_k^i$ and predicted $\hat{\delta}_k^i$ relative percentage change for ith asset), $$D(\delta_k^i, \hat{\delta}_k^i) = \begin{cases} 0 & \text{if } \delta_k^i, \hat{\delta}_k^i \text{ share the same sign} \\ 1 & \text{otherwise} \end{cases}$$

For each asset, the predicted pixel values averaged within the corresponding tile in the heatmap are converted back to numerical data $\hat{\delta}_k^i$ using the inverse of Equation 1 above. Note that the exponentially decaying weight $w_k$ is used to weight the prediction errors. k=0 indicates the 1st day into the future following the given days in the input. This is to reflect that it is more important to achieve a better prediction in the near future as compared to relatively far into the future.

Figure 8:
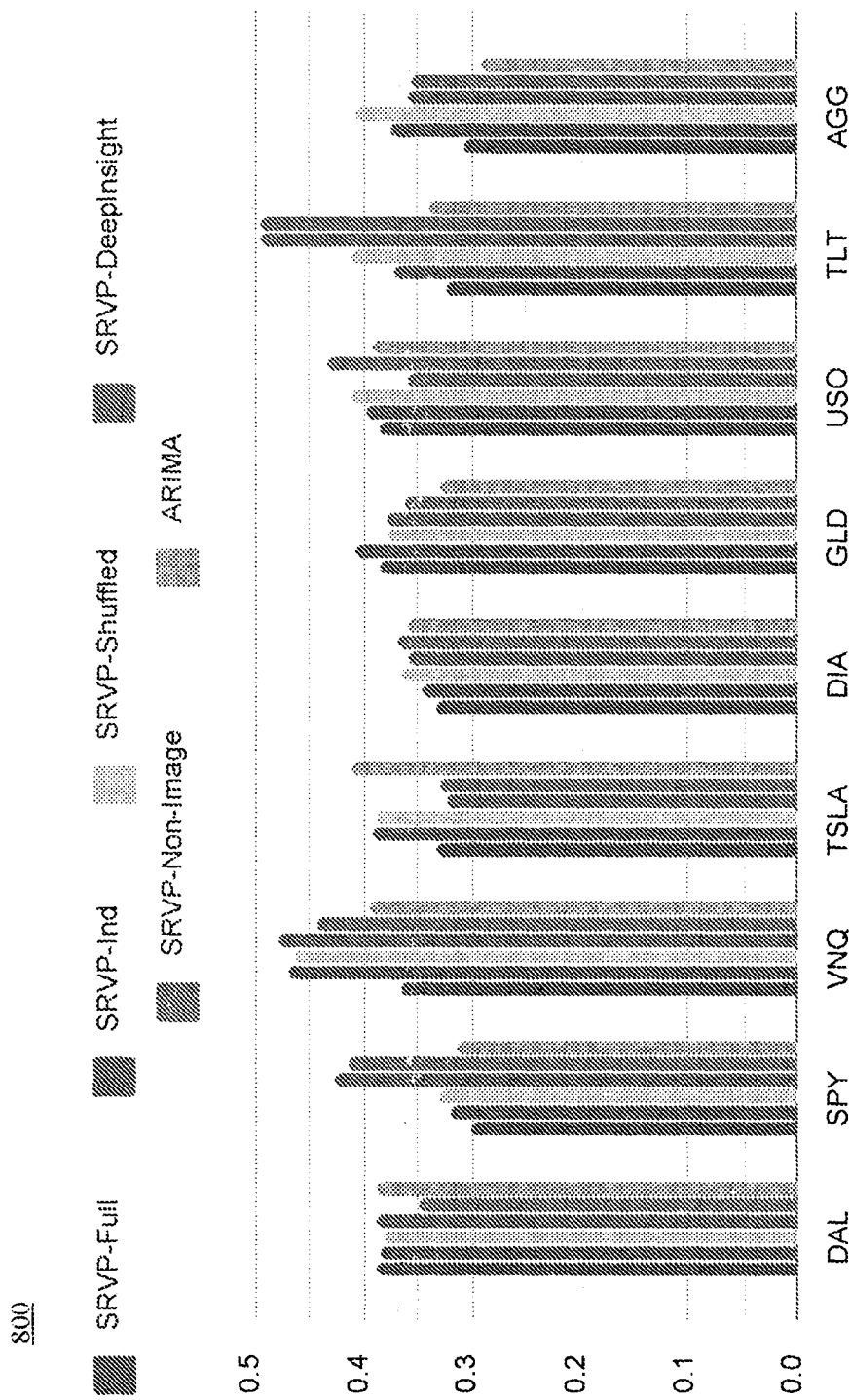
FIG. 8 and FIG. 9 are graphs that illustrate a prediction error of several methods for converting time-series data into images using two-dimensional visualization techniques and then forecasting future images that may be mapped to market forecasts, according to an exemplary embodiment.
Figure 9:
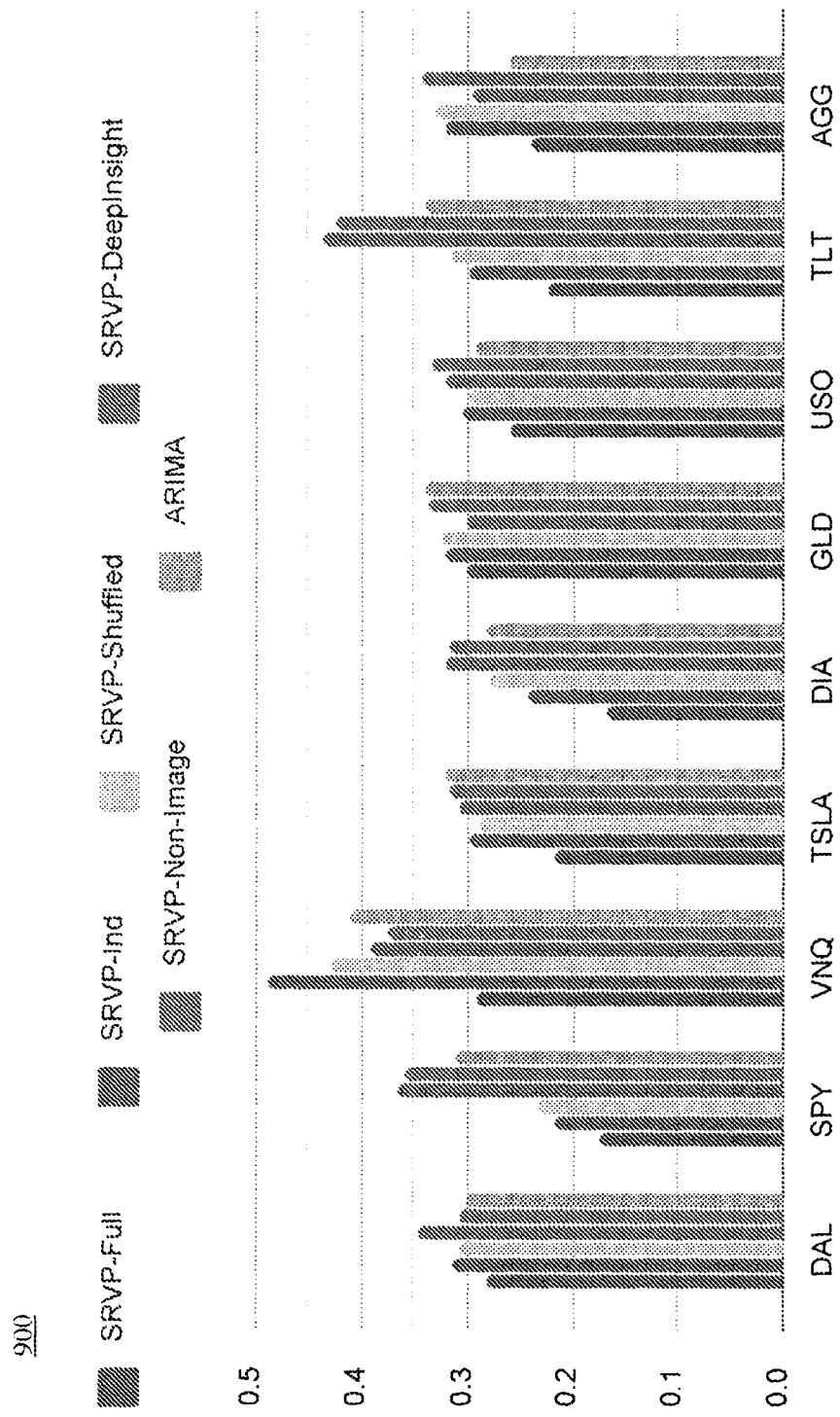

FIG. 8 and FIG. 9 are graphs 800 and 900 that illustrate a prediction error of several methods for converting time-series data into images using two-dimensional visualization techniques and then forecasting future images that may be mapped to market forecasts, according to an exemplary embodiment. In particular, the prediction performance for each asset is shown in FIGS. 8 and 9. When λ=0.5 as in FIG. 8, the weights $w_k$ of prediction error at each future time stamp are 1.0, 0, 61, 0.37, 0, 22, 0.14, . . . , which indicates that the prediction errors starting on the fifth day into the future do not matter as much. When λ=10 as in FIG. 9, the weights $w_k$ of prediction error at each future time stamp are 1.0, 0, 0, . . . , indicating that the focus is on the prediction performance for the very next future day.

As may be seen in FIG. 8 and FIG. 9, for either λ value, SRVP-Full outperforms other baseline methods across all 9 assets. More importantly, there is a showing that when learning to predict the market changes jointly, better prediction performance is achieved in SRVP-Full compared to SRVP-Ind, which learns to predict the change of each asset independently. This is because SRVP-Full allows the network to learn and exploit the joint dynamics of these assets, where the interdependencies between these assets play an important role.

There is also a showing that SRVP-Full outperforms SRVP-DeepInsight. DeepInsight was originally proposed for classification tasks, and it corresponds each asset to a single pixel during visualization, resulting in a sparse set of points in the image, as illustrated in FIG. 7. A key issue is that this method can lead to different assets being visualized at the same pixel locations, thus generating pixel location conflicts, and one has to retain one of the assets information and discard the others at such conflicted pixel locations. Although DeepInsight has been shown to be suitable for classification tasks, it appears to be less suitable for prediction tasks, due to the sparse visualization and especially pixel location conflicts.

Without the 2D structural information from visualized images, it may be seen that SRVP-Non-Image and ARIMA lead to more prediction errors than SRVP-Full in general. This suggests that by turning non-image time-series forecasting into a video prediction problem, informative 2D structure has been introduced into the visualized images, which can be leveraged by SRVP-Full for forecasting.

Domain Knowledge: When comparing SRVP-Shuffled against SRVP-Full, a drop in prediction performance in SRVP-Shuffled may be clearly observed. This is because SRVP-Shuffled suffers from the poor 3×3 tile arrangements of those 9 assets, where correlated assets are placed spatially apart from each other in the visualization. On the contrary, SRVP-Full uses domain knowledge in finance to guide the 3×3 tile arrangements of those 9 assets. For instance, SPY and DIA, which represent the similar S&P 500 stock index and the Dow Jones Industrial index respectively, are located next to one another. TLT and AGG, which represent large bond indexes are also placed adjacently.

Taking the advantage of domain knowledge, SRVP-Full places correlated assets close to each other during visualization, and achieves a better prediction performance because CNNs are able to extract high-level structural feature from local regions.

Accordingly, with this technology, an optimized process for converting time-series data into images using two-dimensional visualization techniques and then forecasting future images that may be mapped to market forecasts is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for forecasting a change in a market, the method being implemented by at least one processor, the method comprising:

receiving, by the at least one processor, historical market data;

converting, by the at least one processor via a video prediction network that uses computer vision techniques and includes a neural network, the historical market data into a plurality of first image video frames that correspond to a predetermined time sequence, wherein the historical market data includes a respective plurality of daily market closing values for each of a predetermined plurality of financial assets, and wherein the plurality of first image video frames includes, for each respective financial asset from the predetermined plurality of financial assets, a corresponding rectangle that is color-coded based on each respective percentage change in value over a predetermined time period, such that the percentage of change is converted into a corresponding pixel value representing the corresponding color-code of the corresponding rectangle;

inputting, by the at least one processor via the video prediction network, the plurality of first image video frames into the neural network to train the neural network for forecasting future images;

generating, by the at least one processor via the video prediction network, at least one future image video frame that corresponds to a future time point with respect to the predetermined time sequence, wherein the video prediction network applies the computer vision techniques and the neural network to the plurality of first image video frames to generate the at least one future image video frame; and determining, by the at least one processor via the video prediction network, a prediction of future market data based on the at least one future image video frame, wherein the generating of the at least one future image video frame further includes:

encoding, via a content variable, static content of the plurality of first image video frames;

inputting at least one latent state variable into a multilayer perception (MLP) to learn first order movement of the at least one latent state variable;

encoding, via a CNN-based encoder network, the plurality of first image video frames into a plurality of first image encoded video frames;

inferring an initial latent state from at least one of the plurality of first image encoded video frames;

inferring, via a long short-term memory, latent dynamics from the plurality of first image encoded video frames; and concatenating, via a decoder network, the content variable and the at least one latent state variable for generating of the at least one future image video frame.

2. The method of claim 1, wherein the corresponding pixel value is between zero and 255.

3. The method of claim 2, wherein for each of the plurality of first image video frames, each corresponding rectangle is arranged, with respect to one another on a tile-arrangement heatmap, based on at least one correlation between the respective percentage change in value for corresponding ones of the predetermined plurality of financial assets.

4. The method of claim 1, further comprising applying a convolutional neural network (CNN) and Long Short-Term Memory (LSTM) algorithm in order to generate the at least one future image video frame.

5. The method of claim 4, wherein the CNN and LSTM algorithm implements a stochastic latent residual video prediction (SRVP) technique for the determining of the prediction of future market data that relates to the predetermined plurality of financial assets.

6. The method of claim 5, wherein the SRVP technique comprises a full SRVP technique by which the future market data is determined jointly with respect to the predetermined plurality of financial assets.

7. The method of claim 5, wherein the SRVP technique comprises an individual SRVP technique by which the future market data for each of the predetermined plurality of financial assets is determined independently.

8. The method of claim 5, wherein the SRVP technique comprises a shuffled SR VP technique by which the at least one future image video frame is modified by rearranging respective portions of the at least one future image video frame based on at least one known correlation as between respective pairs of individual financial assets from among the predetermined plurality of financial assets, and the future market data is determined jointly with respect to the predetermined plurality of financial assets based on the modified at least one future image video frame.

9. A computing apparatus for forecasting a change in a market, the computing apparatus comprising:

a processor;

a memory; and a communication interface coupled to each of the processor and the memory, wherein the processor is configured to:

receive historical market data;

convert, via a video prediction network that uses computer vision techniques and includes a neural network, the historical market data into a plurality of first image video frames that correspond to a predetermined time sequence, wherein the historical market data includes a respective plurality of daily market closing values for each of a predetermined plurality of financial assets, and wherein the plurality of first image video frames includes, for each respective financial asset from the predetermined plurality of financial assets, a corresponding rectangle that is color-coded based on each respective percentage change in value over a predetermined time period, such that the percentage of change is converted into a corresponding pixel value representing the corresponding color-code of the corresponding rectangle;

input, via the video prediction network, the plurality of first image video frames into the neural network to train the neural network for forecasting future images;

generate, via the video prediction network, at least one future image video frame that corresponds to a future time point with respect to the predetermined time sequence, wherein the video prediction network applies the computer vision techniques and the neural network to the plurality of first image video frames to generate the at least one future image video frame; and determine, via the video prediction network, a prediction of future market data based on the at least one future image video frame, wherein the generating of the at least one future image video frame further includes:

encoding, via a content variable, static content of the plurality of first image video frames;

inputting at least one latent state variable into a multilayer perception (MLP) to learn first order movement of the at least one latent state variable;

encoding, via a CNN-based encoder network, the plurality of first image video frames into a plurality of first image encoded video frames;

inferring an initial latent state from at least one of the plurality of first image encoded video frames;

inferring, via a long short-term memory, latent dynamics from the plurality of first image encoded video frames; and concatenating, via a decoder network, the content variable and the at least one latent state variable for the generating of the at least one future image video frame.

10. The computing apparatus of claim 9, wherein the corresponding pixel value is between zero and 255.

11. The computing apparatus of claim 10, wherein for each of the plurality of first image video frames, each corresponding rectangle is arranged, with respect to one another on a tile-arrangement heatmap, based on at least one correlation between the percentage change in value for corresponding ones of the predetermined plurality of financial assets.

12. The computing apparatus of claim 9, wherein the processor is further configured to apply a convolutional neural network (CNN) and Long Short-Term Memory (LSTM) algorithm for performing the generation of the at least one future image video frame.

13. The computing apparatus of claim 12, wherein the CNN and LSTM algorithm is configured to implement a stochastic latent residual video prediction (SRVP) technique for the determination of the prediction of future market data that relates to the predetermined plurality of financial assets.

14. The computing apparatus of claim 13, wherein the SRVP technique comprises a full SRVP technique by which the future market data is determined jointly with respect to the predetermined plurality of financial assets.

15. The computing apparatus of claim 13, wherein the SRVP technique comprises an individual SRVP technique by which the future market data for each of the predetermined plurality of financial assets is determined independently.

16. The computing apparatus of claim 13, wherein the SRVP technique comprises a shuffled SRVP technique by which the at least one future image video frame is modified by rearranging respective portions of the at least one future image video frame based on at least one known correlation as between respective pairs of individual financial assets from among the predetermined plurality of financial assets, and the future market data is determined jointly with respect to the predetermined plurality of financial assets based on the modified at least one future image video frame.

17. A non-transitory computer readable storage medium storing instructions for forecasting a change in a market, the storage medium comprising executable code which, when executed by a processor, causes the processor to:

receive historical market data;

convert, via a video prediction network that uses computer vision techniques and includes a neural network, the historical market data into a plurality of first image video frames that correspond to a predetermined time sequence, wherein the historical market data includes a respective plurality of daily market closing values for each of a predetermined plurality of financial assets, and wherein the plurality of first image video frames includes, for each respective financial asset from the predetermined plurality of financial assets, a corresponding rectangle that is color-coded based on each respective percentage change in value over a predetermined time period, such that the percentage of change is converted into a corresponding pixel value representing the corresponding color-code of the corresponding rectangle;

input, via the video prediction network, the plurality of first image video frames into the neural network to train the neural network for forecasting future images;

generate, via the video prediction network, at least one future image video frame that corresponds to a future time point with respect to the predetermined time sequence, wherein the video prediction network applies the computer vision techniques and the neural network to the plurality of first image video frames to generate the at least one future image video frame; and determine, via the video prediction network, a prediction of future market data based on the at least one future image video frame, wherein the generating of the at least one future image video frame further includes:

encoding, via a content variable, static content of the plurality of first image video frames;

inputting at least one latent state variable into a multilayer perception (MLP) to learn first order movement of the at least one latent state variable;

encoding, via a CNN-based encoder network, the plurality of first image video frames into a plurality of first image encoded video frames;

inferring an initial latent state from at least one of the plurality of first image encoded video frames;

inferring, via a long short-term memory, latent dynamics from the plurality of first image encoded video frames; and concatenating, via a decoder network, the content variable and the at least one latent state variable for the generating of the at least one future image video frame.

* * * * *